(12) United States Patent
Zhang et al.

(10) Patent No.: US 11,231,580 B2
(45) Date of Patent: Jan. 25, 2022

(54) EYE TRACKING DEVICE AND VIRTUAL REALITY IMAGING APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuebing Zhang, Beijing (CN); Chenru Wang, Beijing (CN); Ruijun Dong, Beijing (CN); Yali Liu, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/199,978

(22) Filed: Nov. 26, 2018

(65) Prior Publication Data
US 2019/0293930 A1    Sep. 26, 2019

(30) Foreign Application Priority Data
Mar. 23, 2018  (CN) .......................... 201810243486.X

(51) Int. Cl.
*G06F 3/01*      (2006.01)
*G02B 27/00*    (2006.01)
(Continued)

(52) U.S. Cl.
CPC ......... *G02B 27/0093* (2013.01); *G06F 3/013* (2013.01); *G06K 9/00214* (2013.01); *G06T 19/006* (2013.01)

(58) Field of Classification Search
CPC ........ G02B 27/0093; G02B 2027/0105; G02B 2027/013; G02B 27/0101;
(Continued)

(56) References Cited

U.S. PATENT DOCUMENTS

2001/0009478 A1* 7/2001 Yamazaki ............ G02B 27/017
359/630
2005/0264502 A1* 12/2005 Sprague .................. G02B 5/10
345/84
(Continued)

FOREIGN PATENT DOCUMENTS

| CN | 105408802 A | 3/2016 |
| CN | 106164745 A | 11/2016 |
| CN | 107533362 A | 1/2018 |

OTHER PUBLICATIONS

China First Office Action, Application No. 201810243486.X, dated Dec. 30, 2019, 15 pps.: with English translation.
(Continued)

*Primary Examiner* — Roberto W Flores
(74) *Attorney, Agent, or Firm* — Armstrong Teasdale LLP

(57) ABSTRACT

Embodiments of the disclosure relate to an eye tracking device and a virtual reality imaging apparatus. The eye tracking device includes an electromagnetic radiation source configured to emit electromagnetic radiation toward an eye, a lens having a first side surface facing the eye and a second side surface opposite the first side surface, a first reflective film on the first side surface of the lens for reflecting the electromagnetic radiation, a second reflective film on the second side surface of the lens for reflecting the electromagnetic radiation, and an imaging means configured to receive the electromagnetic radiation from the eye, wherein the first reflective film and the second reflective film are positioned to direct the electromagnetic radiation from the eye to the imaging means.

19 Claims, 4 Drawing Sheets

(51) Int. Cl.
*G06K 9/00* (2006.01)
*G06T 19/00* (2011.01)

(58) Field of Classification Search
CPC .... G02B 2027/0138; G02B 2027/0178; G06F 3/013; G06F 3/011; G06K 9/00214; G06K 9/2018; G06K 9/0061; G06K 9/00604; G06K 9/00597; G06T 19/006
USPC ........................................................ 345/156
See application file for complete search history.

(56) References Cited

U.S. PATENT DOCUMENTS

| | | | | |
|---|---|---|---|---|
| 2014/0375790 | A1* | 12/2014 | Robbins | G02B 27/017 348/78 |
| 2015/0205132 | A1* | 7/2015 | Osterhout | G02B 27/0093 345/633 |
| 2016/0377870 | A1* | 12/2016 | Pilkinton | G02B 27/0172 345/8 |
| 2017/0262703 | A1* | 9/2017 | Wilson | G06F 3/0304 |
| 2017/0316264 | A1 | 11/2017 | Gustafsson et al. | |
| 2018/0003862 | A1* | 1/2018 | Benitez | H04N 13/344 |
| 2019/0187482 | A1* | 6/2019 | Lanman | G02B 27/0179 |
| 2021/0055560 | A1* | 2/2021 | Ben Tez | G02B 27/0172 |

OTHER PUBLICATIONS

China Third Office Action, Application No. 201810243486.X, dated Mar. 29, 2021, 15 pps.: with English translation.

\* cited by examiner

EYE TRACKING DEVICE AND VIRTUAL REALITY IMAGING APPARATUS

CROSS REFERENCE TO RELATED APPLICATIONS

This patent application claims the benefit and priority of Chinese Patent Application No. 201810243486.X filed on Mar. 23, 2018, the disclosure of which is incorporated by reference herein in its entirety as part of the present application.

BACKGROUND

Embodiments of the present disclosure relate to the field of display technologies, and in particular, to an eye tracking device and a virtual reality imaging apparatus.

Modern computing and display technologies have facilitated the development of systems for so called "virtual reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input. Currently, virtual reality has been developed into a technology that is now implemented at low cost through inexpensive devices such as mobile phone components. In particular, the development of high-resolution microdisplays and modern GPUs (graphic processing units) has contributed to a very realistic experience.

BRIEF DESCRIPTION

Embodiments of the present disclosure provide an eye tracking device and a virtual reality imaging apparatus.

An aspect of the present disclosure provides an eye tracking device. The eye tracking device may include an electromagnetic radiation source configured to emit electromagnetic radiation toward an eye, a lens having a first side surface facing the eye and a second side surface opposite the first side surface, a first reflective film on the first side surface of the lens for reflecting the electromagnetic radiation, a second reflective film on the second side surface of the lens for reflecting the electromagnetic radiation, and an imaging means configured to receive the electromagnetic radiation from the eye. In an embodiment of the present disclosure, the first reflective film and the second reflective film may be positioned to direct the electromagnetic radiation from the eye to the imaging means.

In an exemplary embodiment, a plane in which an optical axis of the lens is located may divide the lens into a first half and a second half, wherein the first reflective film may be located at one of the first half and the second half, and the second reflective film may be located at the other of the first half and the second half.

In an exemplary embodiment, the imaging means may be located on the same side as the second side surface of the lens.

In an exemplary embodiment, the electromagnetic radiation may include non-visible light.

In an exemplary embodiment, the non-visible light may include infrared light, and the imaging means may include an infrared imaging means.

In an exemplary embodiment, the electromagnetic radiation source may be located at a periphery of the lens.

In an exemplary embodiment, the electromagnetic radiation source and the imaging means may be integral.

In an exemplary embodiment, the electromagnetic radiation source may include at least two electromagnetic radiation sources that are evenly arranged at the periphery of the lens.

In an exemplary embodiment, the eye tracking device may also include a housing for receiving the lens.

In an exemplary embodiment, the electromagnetic radiation source and the imaging means may be placed on the housing.

In an exemplary embodiment, the lens includes a multi-focal lens which may include at least two lens regions having different focal lengths.

In an exemplary embodiment, one of the at least two lens regions may be a circular region located at a center of the lens, and the remaining lens region of the at least two lens regions may be an annular region surrounding the circular region.

In an exemplary embodiment, the materials of the first reflective film and the second reflective film include $TiO_2$, $SiO_2$, or a laminate thereof.

Another aspect of the present disclosure provides a virtual reality imaging apparatus. The virtual reality imaging apparatus may include an eye tracking device as described in one or more embodiments above or below.

In an exemplary embodiment, the lens acts as an imaging lens of the virtual reality imaging apparatus.

Further aspects and areas of applicability will become apparent from the description provided herein. It should be understood that various aspects of this application may be implemented individually or in combination with one or more other aspects. It should also be understood that the description and specific examples herein are intended for purposes of illustration only and are not intended to limit the scope of the present application.

BRIEF DESCRIPTION OF THE DRAWINGS

The drawings described herein are for illustrative purposes only of selected embodiments and not all possible implementations, and are not intended to limit the scope of the present application, wherein.

Corresponding reference numerals indicate corresponding parts or features throughout the several views of the drawings.

DETAILED DESCRIPTION

Figure 1:
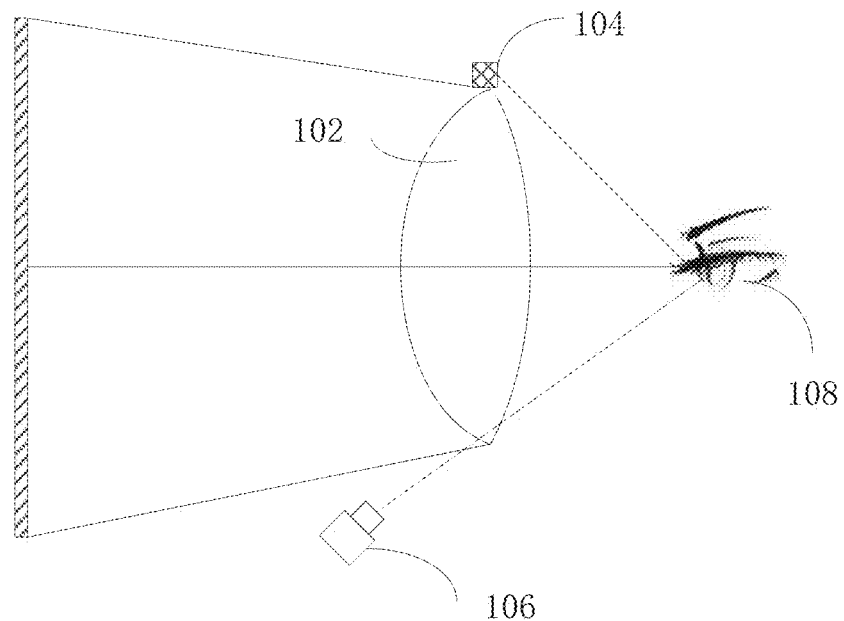
FIG. 1 schematically shows an example eye tracking device.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure.

Where certain elements of the present disclosure may be partially or fully implemented using known components, only those portions of such known components that are necessary for an understanding of the present disclosure will be described, and the detailed descriptions of other portions of such known components will be omitted so as not to obscure the disclosure. Further, various embodiments encompass present and future known equivalents to the components referred to herein by way of illustration.

For purposes of the description hereinafter, the terms "upper", "lower", "right", "left", "vertical", "horizontal", "top", "bottom", and derivatives thereof shall relate to the disclosure, as it is oriented in the drawing figures. The terms "overlying", "atop", "positioned on", or "positioned atop" means that a first element, such as a first structure, is present on a second element, such as a second structure, wherein intervening elements, such as an interface structure, e.g. interface layer, may be present between the first element and the second element.

It should also be noted that when introducing the elements of this application and their embodiments, the terms "a", "an", "the" and "said" are intended to indicate the presence of one or more elements, unless otherwise stated, the meaning of "multiple/a plurality of" is two or more; the terms "first", "second", "third", etc. are used for the purpose of description only, and are not to be construed as suggesting or implying relative importance and order of formation.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

Eye tracking technology is commonly used in virtual reality display. Eye tracking technology is also known as visual tracking technology. Eye tracking technology is a technology belonging to machine vision technology, which captures an image of the eye through an image sensor, recognizes the features of pupil of each person's eye according to the processing of the image and calculates the gaze point on the screen in real time through these features.

On one hand, eye tracking technology may provide a new type of human-computer interaction, without relying on a mouse, keyboard or gamepad, and the human-computer interaction may be achieved only through eye movements, on the other hand, eye movements obtained based on eye tracking technology may be used to locally render images. As an example, eye tracking technology may be used to obtain the gaze point of the eye on the display screen, and during an image is rendered, the sharpness of the image within a specific region range around the gaze point may be improved, and the sharpness of the image exceeding the specific region may be reduced, thereby improving the image processing speed and saving the image processing power.

FIG. 1 schematically shows an example eye tracking device. The eye tracking device may be applied to a virtual reality display apparatus. As shown in FIG. 1, the eye tracking device may include, for example, a lens 102, a light source 104 on a periphery of the lens, and an imaging means (such as a camera) 106. In use state, the light source 104 and the imaging means 106 are configured to be aligned with the user's eye 108 such that light emitted by the light source 104 illuminates the user's eye 108 and then is reflected by the user's eye 108 to the imaging means 106, thereby enabling the imaging means 106 to directly image the user's eye 108. In such an eye tracking device, in order not to obstruct the line of sight, the imaging means 106 needs to be placed outside the field of view of the user, such as below the field of view or above the field of view, which allows the imaging means to image the eye at an oblique angle, and thus causes the captured image of the eye to be distorted. During the processing of an image, it is necessary to perform distortion correction first, which undoubtedly increases the amount of calculation of image processing, and also reduces the accuracy and speed of eye tracking.

Figure 2:
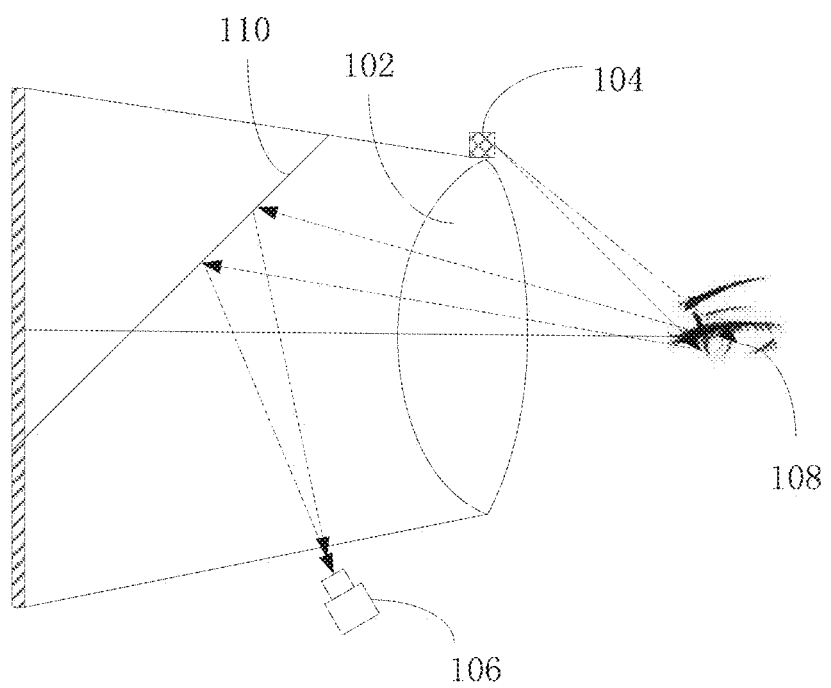
FIG. 2 schematically shows another example eye tracking device.

FIG. 2 schematically shows another example eye tracking device. In addition to the lens 102, the light source 104 and the imaging means 106, the eye tracking device further includes a reflective element 110 arranged on a side of the lens 102 facing away from the eye (in use state). Typically, the reflective element 110 is arranged at a predetermined angle (e.g., about 45°) to a direction of the horizontal line of sight of the user, and the imaging means 106 is arranged toward the reflective element 110 to receive light from the reflective element 110. Light emitted by the light source 104 toward the eye 108 is reflected by the eye 108 and then reflected by the reflective element 110 toward the imaging means 106 to allow the imaging means 106 to image the eye 108. Such an eye tracking device is capable of reducing the distortion of the image of the eye 108. However, due to the need to provide a special reflective element and high requirements for the alignment of the reflective element 110 with the imaging means 106 during assembly, this undoubtedly increases the structural complexity of the eye tracking device (especially an apparatus such an eye tracking device, for example, a virtual reality imaging apparatus).

An aspect of the present disclosure provides an eye tracking device which has reduced structural complexity and is capable of achieving higher tracking accuracy and speed.

It should be noted that the eye tracking device provided by embodiments of the present disclosure may be used in conjunction with other apparatuses such as a virtual reality imaging apparatus.

Figure 3:
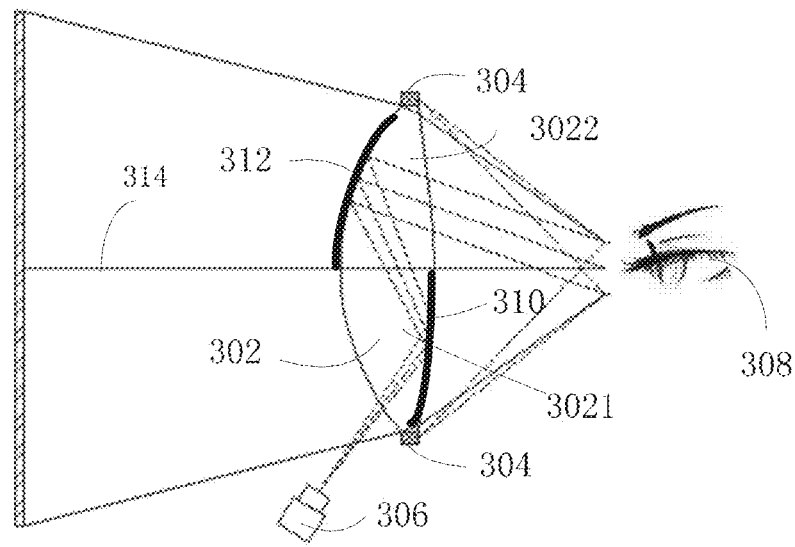
FIG. 3 schematically shows an example eye tracking device according to an embodiment of the present disclosure.

FIG. 3 schematically illustrates an example eye tracking device according to an embodiment of the present disclosure. As shown in FIG. 3, the eye tracking device may include an electromagnetic radiation source 304 configured to emit electromagnetic radiation toward the eye 308, a lens 302 having a first side surface facing the eye 308 and a second side surface opposite the first side surface, a first reflective film 310 on the first side surface of the lens 302 for reflecting electromagnetic radiation, a second reflective film 312 on the second side surface of the lens 302 for reflecting electromagnetic radiation, and an imaging means 306 configured to receive electromagnetic radiation from the eye 308 to image the eye 308. In an embodiment of the present disclosure, the first reflective film 310 and the second reflective film 312 are positioned to direct electromagnetic radiation from the eye 308 to the imaging means 306.

The electromagnetic radiation source 304 may emit electromagnetic radiation toward the user's eye 308, which in turn reflects the electromagnetic radiation from the electromagnetic radiation source 304 so as to be received by the imaging means 306. In an embodiment of the present disclosure, the electromagnetic radiation source 304 may be a non-visible light source, such as an infrared light source. Accordingly, the electromagnetic radiation may include non-visible light, such as infrared light. This enables eye tracking without affecting the user's viewing.

To illustrate the effects, advantages, and feasibilities of embodiments of the present disclosure, a light source capable of emitting light in the infrared spectral range is employed herein as an exemplary electromagnetic radiation source 304. However, it is not intended to limit the scope of the present disclosure to this particular electromagnetic radiation or electromagnetic radiation source 304. Where appropriate, the electromagnetic radiation emitted by the electromagnetic radiation source 304 may also include other wavelength ranges. By way of this example, those skilled in the art may easily recognize how to adapt relevant configurations and conditions when employing electromagnetic radiation in other wavelength ranges.

In an embodiment of the present disclosure, the infrared light source may be arranged at any location that may emit light toward the user's eye. As an example, in order not to obstruct the user's line of sight, the light source 304 may be placed on the periphery of the lens 302 (as shown in FIG. 3). As a further example, the light source 304 may be arranged separately from the lens or may be fixed to the lens 302 through a fixture. By way of example, the light source 304 may include one or more of the following light sources: a laser, such as a laser diode, a light emitting diode, such as an organic light emitting diode and an inorganic light emitting diode. In embodiments of the present disclosure, the number of light sources is also not limited, and there may be one, two or more light sources. In the case of a plurality of light sources, by way of example, the light sources may be evenly arranged on the periphery of the lens to obtain an image of the eye with uniform brightness through the imaging means.

As shown in FIG. 3, the lens 302 has a first side surface facing the eye in a use state and a second side surface opposite the first side surface. In the case where the eye tracking device provided by the embodiment of the present disclosure is applied to a VR display device, the lens 302 may function as an imaging lens of the VR display device.

In an embodiment of the present disclosure, the lens 302 may be a single convex lens or a biconvex lens. However, the types of the lenses 302 herein are merely exemplary and are not intended to limit the scope of the disclosure to these types. A person skilled in the art may appropriately select a suitable type of lens 302 as needed.

Figure 6A:
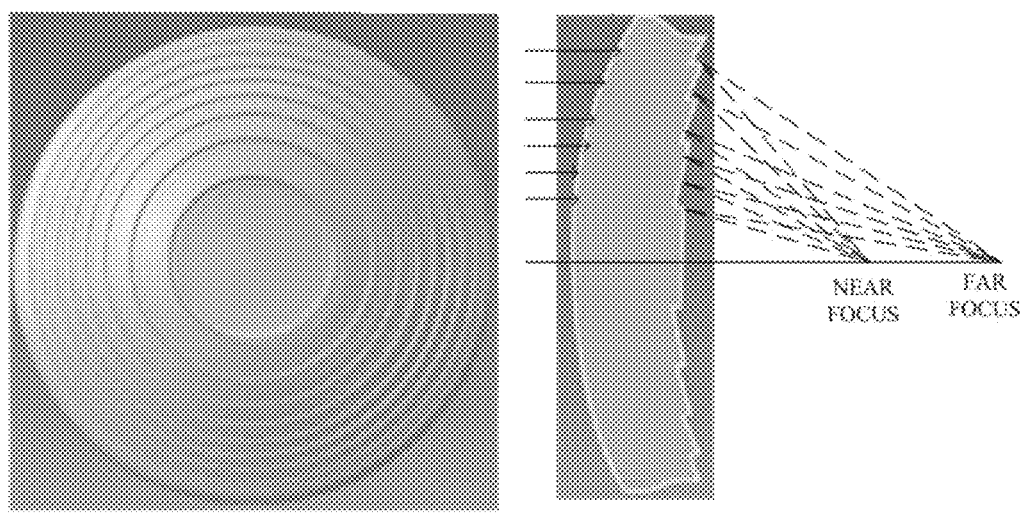
FIG. 6A schematically shows an example multi-focal lens in an embodiment of the present disclosure.
Figure 6B:
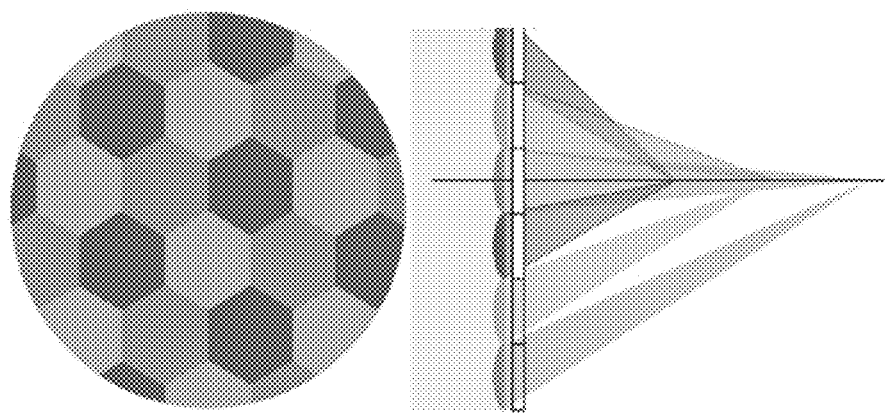
FIG. 6B schematically shows another example multi-focal lens in an embodiment of the present disclosure.

In an embodiment of the present disclosure, the lens 302 may be a single focus lens, i.e., has only one focal length. In an alternative embodiment, the lens 302 may be a multi-focal lens that may include at least two lens regions with different focal lengths. As an example, one of the at least two lens regions may be a circular region located at the center of the lens, and the remaining lens region may be an annular region surrounding the circular region, as illustrated in FIG. 6A where a top view of the example multi-focal lens is shown on the left, and a cross section of the multi-focal lens is shown on the right. As another example, the at least two lens regions may include a plurality of hexagonal regions in a tiled arrangement, as illustrated in FIG. 6B where a top view of the another example multi-focal lens is shown on the left, and a cross section of the another example multi-focal lens is shown on the right. As a further example, each of the at least two lens regions may be a sector region. In an embodiment in which a multi-focal lens is used, especially in the case where the eye tracking device is used in combination with the virtual reality imaging apparatus, the focal length used may be switched in real time according to the viewpoint position of the eye, so that the focal length used matches the viewpoint of the eye, whereby visual fatigue due to convergence-adjustment conflicts when viewing VR images may be alleviated.

Again, as shown in FIG. 3, the first reflective film 310 and the second reflective film 312 are respectively located on the first side surface and the second side surface of the lens 302, and are positioned to direct electromagnetic radiation from the eye 308 to the imaging means 306 by reflecting electromagnetic radiation, so as to image the eye 308 through the imaging means 306.

In an embodiment of the present disclosure, a plane in which the optical axis 314 of the lens 302 is located may divide the lens 302 into a first half 3021 and a second half 3022. The first reflective film 310 may be located at the first half 3021, and the second reflective film 312 may be located at the second half 3022. In the example embodiment shown in FIG. 3, the first reflective film 310 is located at the lower half of the lens (the first half 3021) and the second reflective film 312 is located at the upper half of the lens (the second half 3022). With this configuration, the first reflective film 310 and the second reflective film 312 may not be obstructed from each other so that light from the eye 308 may be transmitted to the imaging means 306.

In the case where the electromagnetic radiation source 304 is an infrared light source that emits infrared light, the first reflective film 310 and the second reflective film 312 may be made of a material capable of reflecting infrared light and transmitting visible light, for example, a material having high transmittance to visible light, so as not to affect the user viewing the VR image through the lens, that is, without affecting the sharpness of the viewed image. In an embodiment of the present disclosure, the first reflective film 310 and the second reflective film 312 may be a single-layered film or a multi-layered film. By way of example, the material forming the first reflective film 310 and the second reflective film 312 may be a transparent dielectric material capable of transmitting visible light and reflecting infrared light, such as $TiO_2$, $SiO_2$, or a laminate thereof. In an embodiment of the present disclosure, $TiO_2$ and $SiO_2$ may be doped, for example, Zn-doped or the like. By way of example, the first reflective film 310 and the second reflective film 312 may be formed on the surface of the lens 302 by an evaporation or sputtering process. Alternatively, the first reflective film 310 and the second reflective film 312 may also be formed in advance and then attached (especially by transparent adhesive) to the surface of the lens 302. It should be noted that, in embodiments of the present disclosure, the forming materials and the preparation processes of the first reflective film 310 and the second reflective film 312 are not intended to limit the scope of the disclosure, and may be appropriately modified or selected by those skilled in the art as needed.

Here, as shown in FIG. 3, the imaging means 306 may be located on the same side as the second side surface of the lens 302 and oriented to be able to receive light from the first reflective film 310. As an example, the imaging means 306 may be arranged at a position on the side of the second side surface of the lens that does not obstruct the user's line of sight, for example, a position near a lower edge of the lens.

In the case where the electromagnetic radiation source 304 is an infrared light source that emits infrared light, the imaging means 306 may be an infrared camera, such as a CCD camera or a CMOS camera.

As shown in FIG. 3, light from the light source is incident on the user's eye 308, reflected by the eye 308, the second reflective film 312, and the first reflective film 310 in sequence, and then received by the imaging means 306, and thus, the imaging means 308 may image the eye 308. In an exemplary embodiment, the imaging means 308 may be connected to an image processing means. A motion trail of the eye 308 may be acquired in real time by analyzing, by the image processing means, the image of the eye 308 acquired by the imaging means 306, such as, by extracting feature points from the image of the eye. Then, a series of gaze points of the eye 308 on the display screen may be derived based on the motion trail of the eye 308, so that real-time tracking of the eye 308 may be realized. Based on these obtained gaze points, for example, a new human-computer interaction and local rendering of the displayed image may be realized, thereby saving computational power and improving image processing speed.

In an exemplary embodiment, the image processing means may be implemented as a separate device or may be integral into further device, such as a computer, a mobile phone, and a notebook computer. The further device may include a processor and a memory, wherein the processor may execute a program stored in the memory to implement a corresponding function of the image processing means. In an alternate embodiment, the imaging means 306 itself may include an image processing means such that the imaging means 306 may process and analyze the image of the eye 308 to obtain a motion trail of the eye.

In an exemplary embodiment, the eye tracking device may also include a housing for receiving the lens. In this embodiment, the electromagnetic radiation source 304 (e.g., an infrared light source) and the imaging means 306 (e.g., a CCD camera or a CMOS camera) may be fixed onto the housing.

In an exemplary embodiment, the electromagnetic radiation source 304 (e.g., an infrared light source) and the imaging means 306 (e.g., a CCD camera or CMOS camera) may be integral. In other words, the imaging means 306 may have an electromagnetic radiation source capable of emitting electromagnetic radiation.

According to the eye tracking device provided by embodiments of the present disclosure, the first reflective film 310 and the second reflective film 312 are arranged on both side surfaces of the lens 302 such that the first reflective film 310 and the second reflective film 312 may reflect light from the eye 308 into the imaging means 306. On one hand, such configuration may avoid the distortion of the image of the eye 308 and may improve the accuracy of the tracking of the eye 308; on the other hand, there is no need to install a special reflective element, which reduces the structural complexity.

Figure 4:
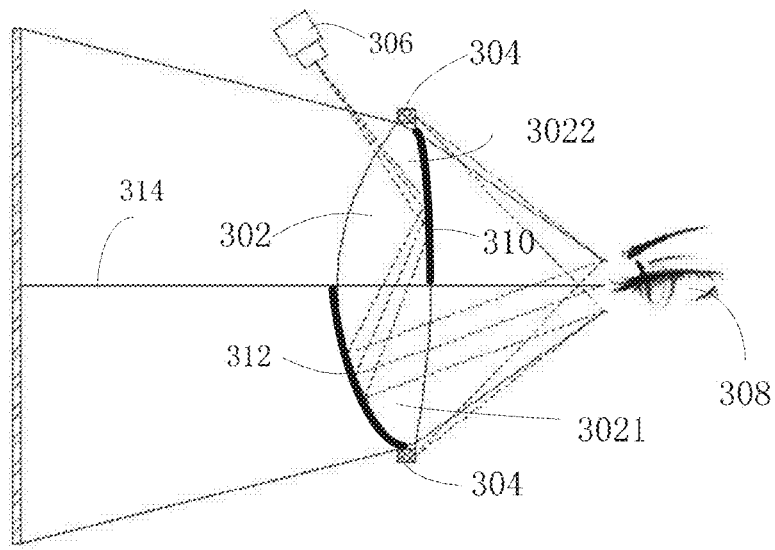
FIG. 4 schematically shows an example eye tracking device according to another embodiment of the present disclosure.

FIG. 4 schematically illustrates an example eye tracking device according to another embodiment of the present disclosure. The embodiment shown in FIG. 4 differs from the embodiment shown in FIG. 3 in that the positions of the imaging means 306, the first reflective element 310 and the second reflective element 312 are different. In the embodiment shown in FIG. 3, the first reflective element 310 is located at the lower half of the first side surface of the lens 302, and the second reflective element 312 is located at the upper half of the second side surface of the lens 302, and the imaging means 306 is located near the lower edge of the lens 302. In the embodiment shown in FIG. 4, the first reflective element 310 is located at the upper half of the first side surface of the lens 302 (the second half 3022), and the second reflective element 312 is located at the lower half of the second side surface of the lens 302 (the first half 3021), and the imaging means 306 is located near the upper edge of the lens 302. Other arrangements shown in FIG. 4 are the same as those of the embodiment shown in FIG. 3.

Similar to the embodiment shown in FIG. 3, as shown in FIG. 4, light from the electromagnetic radiation source 304 (e.g., an infrared light source) is incident on the user's eye 308, reflected by the eye 308, the second reflective film 312, and the first reflective film 310 in sequence, and then received by the imaging means 306. Thus, the imaging means 306 may image the eye 308. In an exemplary embodiment, the imaging means 306 may be connected to the image processing means so as to analyze and process the image of the eye 308. A motion trail of the eye 308 may be acquired in real time by analyzing, by the image processing means, the image of the eye 308 acquired by the imaging means 306, such as, by extracting feature points from the image of the eye 308. Then, a series of gaze points of the eye 308 on the display screen may be derived based on the motion trail of the eye 308, so that real-time tracking of the eye 308 may be realized.

Also similar to the embodiment shown in FIG. 3, on one hand, the eye tracking device provided in the embodiment shown in FIG. 4 may avoid the distortion of the image of the eye obtained by the imaging means and improve the accuracy of eye tracking; on the other hand, there is no need to install a special reflective element, which reduces the structural complexity.

Another aspect of the present disclosure provides a virtual reality imaging apparatus. Alternatively, the virtual reality imaging apparatus may include at least one eye tracking device according to the present disclosure, such as at least one eye tracking device according to one or more embodiments disclosed in detail above. Thus for alternative embodiments of a virtual reality imaging apparatus, reference may be made to embodiments of the eye tracking device.

Figure 5:
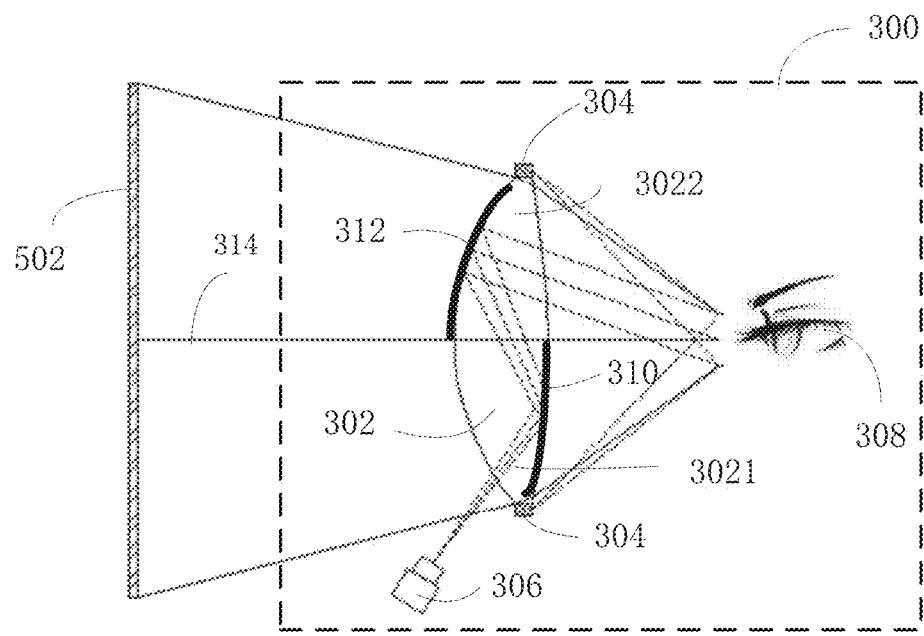
FIG. 5 schematically shows an example virtual reality imaging apparatus according to an embodiment of the present disclosure.

FIG. 5 schematically shows a virtual reality imaging apparatus according to an embodiment of the present disclosure. As shown in FIG. 5, the virtual reality imaging apparatus may include an eye tracking device 300 in the embodiment as shown in FIG. 3 and a display module 502, and the eye tracking device 300 may include an electromagnetic radiation source 304 configured to emit electromagnetic radiation toward the eye 308, a lens 302 having a first side surface facing the eye 308 and a second side surface opposite the first side surface, a first reflective film 310 on the first side surface of the lens 302 for reflecting electromagnetic radiation, a second reflective film 312 on the second side surface of the lens 302 for reflecting electromagnetic radiation, and an imaging means 306 configured to receive electromagnetic radiation from the eye 308 to image the eye 308. The first reflective film 310 and the second reflective film 312 may direct electromagnetic radiation from the eye 308 to the imaging means 306 such that the imaging means 306 images the eye 308. The display module 502 may be any device or component capable of presenting visual information for visual perception, such as, but not limited to, a mobile phone, a notebook computer, a desktop computer, or a display screen dedicated to a virtual reality imaging apparatus.

In another embodiment, the virtual reality imaging apparatus may include an eye tracking device 300 in the embodiment shown in FIG. 4.

According to the virtual reality imaging apparatus provided by embodiments of the present disclosure, the surface of the imaging lens is provided with a first reflective film and a second reflective film capable of reflecting light from the eye to the imaging means, with such configuration, on the one hand, it may avoid the distortion of the image of the eye obtained by the imaging means and improve the accuracy of eye tracking, and on the other hand, there is no need to install a special reflective element, which reduces the structural complexity.

The foregoing description of the embodiment has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

What is claimed is:

1. An eye tracking device comprising:
an electromagnetic radiation source configured to emit electromagnetic radiation toward an eye;
a lens having a first side surface facing the eye and a second side surface opposite the first side surface;
a first reflective film on the first side surface of the lens for reflecting the electromagnetic radiation;
a second reflective film on the second side surface of the lens for reflecting the electromagnetic radiation; and
an imaging apparatus configured to receive the electromagnetic radiation from the eye, wherein the first reflective film and the second reflective film are positioned such that the electromagnetic radiation from the eye is reflected by the second reflective film on the second side surface of the lens toward the first reflective film on the first side surface of the lens, and in turn reflected by the first reflective film toward the imaging apparatus, wherein a plane in which an optical axis of the lens is located divides both the first side surface and the second side surface into a upper half surface and a lower half surface, wherein the first reflective film is arranged at the lower half surface of the first side surface of the lens and no reflective film is arranged at the entire upper half surface of the first side surface of the lens, and wherein the second reflective film is arranged at the upper half surface of the second side surface of the lens and no reflective film is arranged at the entire lower half surface of the second side surface of the lens.

2. The eye tracking device according to claim 1, wherein the imaging apparatus is located on the same side as the second side surface of the lens.

3. The eye tracking device according to claim 1, wherein the electromagnetic radiation comprises non-visible light.

4. The eye tracking device according to claim 3, wherein the non-visible light comprises infrared light, and wherein the imaging apparatus comprises an infrared imaging apparatus.

5. The eye tracking device according to claim 4, wherein materials of the first reflective film and the second reflective film comprise TiO2, SiO2, or a laminate thereof.

6. The eye tracking device according to claim 1, wherein the electromagnetic radiation source is located on a periphery of the lens.

7. The eye tracking device according to claim 6, wherein the electromagnetic radiation source comprises at least two electromagnetic radiation sources that are evenly arranged at the periphery of the lens.

8. The eye tracking device according to claim 1, wherein the electromagnetic radiation source and the imaging apparatus are integral.

9. The eye tracking device according to claim 1, further comprising a housing for receiving the lens.

10. The eye tracking device according to claim 9, wherein the electromagnetic radiation source and the imaging apparatus are placed on the housing.

11. The eye tracking device according to claim 1, wherein the lens comprises a multi-focal lens, and wherein the multi-focal lens comprises at least two lens regions having different focal lengths.

12. The eye tracking device according to claim 11, wherein one of the at least two lens regions is a circular region located at a center of the lens, and wherein the remaining lens region of the at least two lens regions is an annular region surrounding the circular region.

13. A virtual reality imaging apparatus comprising an eye tracking device according to claim 1.

14. The virtual reality imaging apparatus according to claim 13, wherein the lens acts as an imaging lens of the virtual reality imaging apparatus.

15. The virtual reality imaging apparatus according to claim 13, wherein a plane in which an optical axis of the lens is located divides the lens into a first half and a second half, wherein the first reflective film is located at one of the first half and the second half, and wherein the second reflective film is located at the other of the first half and the second half.

16. The virtual reality imaging apparatus according to claim 13, wherein the imaging apparatus is located on the same side as the second side surface of the lens.

17. The virtual reality imaging apparatus according to claim 13, wherein the electromagnetic radiation source is located on a periphery of the lens.

18. The virtual reality imaging apparatus according to claim 17, wherein the electromagnetic radiation source comprises at least two electromagnetic radiation sources evenly arranged at the periphery of the lens.

19. The virtual reality imaging apparatus according to claim 13, wherein the electromagnetic radiation source and the imaging apparatus are integral.

* * * * *